United States Patent [19]

Lampin et al.

[11] Patent Number: 4,485,130

[45] Date of Patent: Nov. 27, 1984

[54] BASIC LIQUID COMPOSITION SUITABLE FOR PRODUCING TRANSPARENT COATINGS OR VARNISHES ON SOLID SURFACES, PROCESS FOR PREPARATION OF SUCH VARNISHES, AND VARNISHES PRODUCED THEREBY

[75] Inventors: Jean-Pierre Lampin, Ponthierry; Yves Leclaire, Veneux les Sablons, both of France

[73] Assignee: Institut National de Recherche Chimique Appliquee, Paris, France

[21] Appl. No.: 473,299

[22] Filed: Mar. 8, 1983

[30] Foreign Application Priority Data

Mar. 16, 1982 [FR] France ................ 82 04409

[51] Int. Cl.$^3$ ................ A23F 3/00
[52] U.S. Cl. ................ 427/387; 427/372.2; 427/374.1; 524/379; 528/10; 528/12; 528/18; 528/21; 528/39
[58] Field of Search ................ 427/372.2, 374.1, 387; 528/10, 12, 18, 21, 39; 524/379

[56] References Cited

U.S. PATENT DOCUMENTS

| | | |
|---|---|---|
| 3,389,114 | 6/1968 | Burzynski et al. ............ 528/10 |
| 3,451,838 | 6/1969 | Burzynski et al. ............ 427/387 |
| 3,460,980 | 8/1969 | Burzynski ............ 528/12 |
| 3,647,510 | 3/1972 | Gagnon et al. ............ 427/387 |
| 3,650,808 | 3/1972 | Gagnon ............ 427/387 |
| 3,707,397 | 12/1972 | Gagnon ............ 427/387 |
| 3,790,527 | 2/1974 | Merrill ............ 528/18 |
| 4,308,371 | 12/1981 | Tanaka et al. ............ 427/387 |

*Primary Examiner*—Melvyn I. Marquis
*Attorney, Agent, or Firm*—Karl W. Flocks; Sheridan Neimark

[57] ABSTRACT

The basic composition comprises, in solution in at least one organic solvent, with or without water, from 10 to 40% of a hard-enable organosilicic compound resulting from a first hydrolysis reaction achieved at a temperature lower than 50° C. in the presence of a carboxylic acid and water on at least one R'Si(OR)$_4$ alkoxysilane with n=1 or 2, in association or without association with at least one Si(OR'')$_4$-alkoxysilane, then, a second hydrolysis at a temperature lower than 40° C. after removal of the formed volatile solvents and addition of a less volatile solvent and at least one R'''Si(OR$_1$)$_3$-alkoxysilane, said reaction being followed with the setting of the pH to between 3.5 and 5.5 by an organic base.

20 Claims, No Drawings

BASIC LIQUID COMPOSITION SUITABLE FOR PRODUCING TRANSPARENT COATINGS OR VARNISHES ON SOLID SURFACES, PROCESS FOR PREPARATION OF SUCH VARNISHES, AND VARNISHES PRODUCED THEREBY

This invention relates to a basic liquid composition suitable for the achievement of transparent coatings or varnishes on solid surfaces. It also relates to the process for the preparation of such varnishes and to the varnishes resulting therefrom.

It is known that solid surfaces that have been submitted to sometimes very extensive treatments or machinings to confer upon them polish, gloss or any other aspect as required by technical or merely decorative requirements or needs, must be protected by suitable coatings to prevent any risks of alteration of the conditions thereof. Such protection is the more necessary the more fragile the surface considered or when the latter is particularly subjected due to its very nature to such risks of alteration or degradation as in the case of for example glass or glass substitutes which are scratchable or opacifiable from the effect of friction, abrasion, or even shocks. Such scratching hazards are met moreover also in the case of other products such as plastic materials, ceramics, porcelain, earthenwares, stonewares, machined or polished metals, and the like.

A number of coatings have already been proposed to prevent or resist such surface degradation; however, such coatings generally present among others at least one of the following deficiencies: insufficient adherence to carrier; insufficiently high scratching and/or abrasion strength; short transparency longevity; short hardness longevity; poor cracking strength; loss of protective efficiency under the effect of water or moist atmospheres.

Furthermore, the solutions from which such coatings are prepared have not sufficient stability in the course of time to permit durable storage. Their degradation with time is actually detrimental to the physical properties of the coatings to be realized.

Therefore, the object of this invention is a basic composition suited for achieving transparent coatings or varnishes and stable in the course of time to permit storage thereof without any risks of degradation, on the one hand, and on the other hand, varnishes which have not any of the above-mentioned deficiencies, but on the contrary present all the following main properties, i.e. good adherence to the carrier, good scratching and/or abrasion strength, good hardness, good opacification strength longevity, good cracking strength, good resistance to water and moist atmospheres, and a sufficient thickness in the hardened varnish.

More especially, the object of this invention is a basic composition for varnishes of the type comprising an organosiloxane or alkoxysilane hydrolysate. This type of composition is actually one of those taught in prior art. The Applicants however have noted in this respect that not only the nature of compounds submitted to hydrolysis was significative, but also that the very conditions of such hydrolysis were extremely significant and that, depending on the selected conditions, the coatings realized from the solutions resulting therefrom could present differing physical properties and behaviours but that generally such coatings had either or several of the above-mentioned deficiencies. Thus, if the nature of the constituents or the hydrolysis conditions are varied to try to improve abrasion strength of the coating achieved, the latter easily cracks and if its cracking strength is improved its abrasion strength is reduced. Moreover, as previously mentioned, the obtained hydrolysate solutions can be kept for only too short a time to be useful for an acceptable period for industrial utilization. Finally, the coatings resulting from such hydrolysate solutions present during the boiling water tests either loss of adherence or loss of hardness or opalescence and defects incompatible with keeping the aspect of the object to be protected or the optic qualities of transmission or reflection thereof.

Moreover, the hardening time of such varnishes is relatively long. Another object of this invention, however, is the reduction of the hardening time while keeping acceptable adherence.

Thus, the Applicants provide for a basic composition which obviates the above-mentioned disadvantages and permits direct achievement of an adherent and hard varnish resisting to shocks, also after boiling water treatment on solid surfaces without resorting to a so-called bottom layer, such composition having moreover a great storage longevity (of at least three months) at the room temperature.

The stable basic composition according to this invention is characterized in that it comprises in solution at least one organic solvent possibly containing, or not, water, from 10 to 40% by weight of a hardenable organosilicic compound corresponding to that resulting from a first hydrolysis reaction, effected at a temperature lower than 50° C. in the presence of a carboxylic acid and water on at least one alkoxysilane compound (A) of formula $R'_n Si(OR)_{4-n}$, (in which n=1 or 2, R represents an alkyl radical with from 1 to 4 carbon atoms, or an alkyloxyalkyl or alkyl radical and R' represents an alkyl, alkylene, aryl, aralkyl, alkylaryl, alkylenearyl radical), in association or without association with at least one alkoxysilane compound (B) of formula $Si(OR'')_4$, (in which R'' represents an alkyl or alkyloxyalkyl radical), said hydrolysis reaction being followed with a period of rest of several hours, then a second hydrolysis reaction effected at a temperature lower than 40° C. on the medium resulting from the first reaction, admixed or not admixed with a solvent and at least one alkoxysilane compound (C) of formula $R'''Si(OR_1)_3$, (in which R''' represents an epoxyalkyl or epoxyalkyloxyalkyl radical, and $R_1$ represents a $C_1$-$C_4$-alkyl radical), said second reaction being followed with a period of rest of several days, then adjustment of the pH of the resulting medium to between 3.5 and 5.5 by addition of an organic base thereto.

According to other characteristics of this invention:
when, in the first hydrolysis there is used an alkoxysilane compound (B) such as defined above, this is used in a concentration corresponding to the ratio of 1 mole of compound (A) to 0 to 0.3 mole of compound (B);
the compound (A) is selected from the following compounds: methyltrimethoxysilane, methyltriethoxysilane, ethyltrimethoxysilane, ethyltriethoxysilane, phenyltrimethoxysilane, phenyltriethoxysilane, propyltrimethoxysilane, propyltriethoxysilane, vinyltrimethoxysilane, vinyltriethoxysilane, dimethyldimethoxysilane, dimethyldiethoxysilane, methyltriacetoxysilane, and the like.

The compound (B) is selected from the following compounds:

tetramethoxysilane, tetraethoxysilane, tetra-n-propyloxysilane, tetramethylglycoloxysilane, tetraethylglycoloxysilane, and the like.

The compound (C) is advantageously gamma-glycidyloxypropyltrimethoxysilane or a similar epoxy silane.

The solvent(s) suitable for the hydrolysis reaction are selected from the solvents of the $C_1$–$C_4$-alkanol type, possibly containing, or not containing, water.

The carboxylic acid may advantageously be selected from acetic, propionic, butyric, acrylic acids, and the like.

The organic base is advantageously an imidazole, an imidine, a cyclic or bicyclic imidine such as N-methylimidazole, diazabicycloundecene (DBU) or diazabicyclononene (DBN), and the like.

The proportion of added organic base corresponding to the desired final pH lies between 0.5 and 5% by weight.

According to another characteristic, the composition of the liquid coating according to the invention has a stability of at least three months at 15° C. Moreover, it may comprise other additives to confer to it, or the coatings resulting therefrom, other much sought-after properties due to said additives themselves, in association with those already obtained according to the invention.

The object of this invention is also a varnish presenting all the above-mentioned properties from a basic composition such as defined above, said varnish being obtained by applying a layer of such liquid composition onto the surface to be protected, then hardening such layer by the action of heat.

Advantageously, the liquid composition has a viscosity of 10 to 20 centipoises and it is applied so that after hardening the varnish contains from 2 to 50 g of solid materials per square meter.

Also advantageously, the coating is hardened by heating to a temperature of between 50° and 200° C. for a period of time that may vary between half an hour and 12 hours.

The invention is particularly suited for use with surfaces of mineral glass, organic glasses of thermo-plastic materials such as plastic materials glass, such as for example polymethacrylate or polycarbonate and the like, or heat hardenable materials such as diallylglycol polycarbonate and the like.

Other characteristics and advantages of this invention will appear more clearly from the following description as well as from the following examples which are drafted in a purely explanatory and not at all limitative manner.

The tests referred to hereinbelow are defined as follows:

(a) as to scratchability/abrasion strength:
(1) through the abrasion test with a USA one-dollar note.
(2) through abrasion with steel wool of 0000 type.
(3) through abrasion with pencil-ink eraser or red-blue eraser.

(b) as to hardness:
through the pencil test for example according to French standard NF S 77-109§3.3 wherein the larger the number H, the higher the hardness of the tested product.

(c) as to adhesion:
through the criss-cross pattern test according to French standard NF T 30 038, with complementary adherence test repeated five times with an adhesive tape (of SCOTCH 3M or similar type).

(d) The resistance to water is evaluated by new measurement of adherence, abrasion strength and hardness, after all the protected objects have been dipped into water brought to as high as temperature as possible depending on the nature of the substrate and for a sufficient time, for example, half an hour, in boiling water, for coatings on polycarbonate, or four hours at 70° C. for methylmethacrylate copolymers.

(f) Finally, the preservation time of the coating liquid is measured by determining the viscosity by means of either a 2.5 mm or 4 mm AFNOR consistometric cutting by checking the pour time, or in centipoises by a Drage viscosimeter with rotary moving object, or any other suitable apparatus for measuring a viscosity in the order of several tens of centipoises.

Example 1

487.4 g of methyltrimethoxysilane, 142 g of tetraethoxysilane and 400 g of n-butanol are mixed together in a reactor. Thereafter 50 g of glacial acetic acid and 248 g of water are introduced therein. The hydrolysis is allowed to take place for one hour by cooling the obtained solution so that the temperature does not exceed 50° C. One hour later, light solvents such as methanol and ethanol formed during the hydrolysis are removed under vacuum cold conditions, to obtain a composition having a theoretical dry extract of 26% (measured in $SiO_2$ and $CH_3SiO_{3/2}$ equivalent).

Then 80 g of glycidyloxypropyltrimethoxysilane and 20 g of water are introduced into the solution. The second hydrolysis is effected by maintaining the temperature strictly lower than 40° C. The pH is then from 3.5 to 4.

After a period of time of 3 to 4 days there is introduced into the solution from 0.8 to 1.3% of DBU (diazabicycloundecene) to bring the pH to between 4.6 and 4.9 so as to obtain a varnish ready for use.

Such varnish presents good storage stability; the 2.5 mm AF-NOR consistometric cutting changes from 38 to 50 seconds after three months at the room temperature.

A thermoplastic polycarbonate lense is dipped into the composition, then it is slowly removed therefrom to leave a regular film on the surface thereof. Such coating is dried in air and is then hardened for one hour at 120° C.

Even after treatment for half an hour in boiling water, the objects coated with such hardened varnish resist the criss-cross pattern test, scratching and water; thus, before and after the boiling water test, the surfaces varnished in this way resist 0000 steel wool and 8H pencil.

Example 2

A process is carried out as in Example 1, by replacing glycidyloxypropyltrimethoxysilane by vinyltriethoxysilane (65 g). The varnish applied to a polycarbonate surface does not resist the criss-cross pattern test whatever the temperature and the baking period.

Example 3

More concentrated varnish.

487.4 g of methyltrimethoxysilane, 142 g of tetraethoxysilane, 242 g of water, 150 g of glacial acetic acid and 300 g of n-butanol are mixed together.

The hydrolysis is effected by maintaining the temperature lower than 50° C., then after one hour the light solvents are removed under vacuum cold conditions.

There is concentrated up to a dry extract of 31.8% i.e. 1768 g of solution, then there is added 160 g of glycidyloxypropyltrimethoxysilane, 40 g of $H_2O$.

In this second hydrolysis the temperature remains lower than 40° C.

After a period of three days, the pH is set to 4.7 through addition of DBU. The varnish is applied by dipping onto a polycarbonate surface and is hardened for two hours at 120° C. After half an hour immersion in boiling water, such hardened varnish resists the criss-cross pattern test.

Example 4

Varnish without tetraethoxysilane.

713.2 g of methyltriethoxysilane, 216.25 g of water, 50 g of glacial acetic acid, 200 g of n-butanol are mixed together.

The hydrolysis takes place as previously mentioned. One hour later the ethanol is removed under vacuum cold conditions.

There is concentrated up to a dry extract of 28.2% i.e. 953 g of solution, then there is added 60 g of glycidyloxypropyltrimethoxysilane, 13.8 g of water.

In such second hydrolysis the temperature remains lower than 40° C.

The varnish applied by dipping to a polycarbonate surface and hardened for one hour at 120° C., resists the criss-cross pattern test, even after half an hour immersion in boiling water. The hardness and abrasion strength of the varnish are however not equal to those of the varnish of Example 1.

Example 5

Other acids than acetic acid.

256.35 g of methyltrimethoxysilane, 77.3 g of tetraethoxysilane, 100 g of n-butanol, 128.5 g of water, 30 g of acrylic acid are mixed together.

The hydrolysis and removal of light solvents are effected as in the preceding Examples.

There is concentrated up to a theoretical dry extract of 20%, then there is added 40 g of glycidyloxypropyltrimethoxysilane and 10 g of water.

Four days later, the pH is set to 4.8 through addition of DBU. Adherence of such varnish is less satisfactory than when acetic acid is used. The varnish applied by dipping on to a polycarbonate surface, hardened for 2 hours at 120° C. does not resist the criss-cross pattern test, when the varnished surface has been immersed for half an hour in boiling water.

Example 6

A process is carried out as previously mentioned by replacing acrylic acid by 30.8 g of propionic acid.

Adherence of such varnish like that of the varnish described in Example 5 is lower than that of the varnish obtained by using acetic acid according to the test described in Example 1. It does not resist the criss-cross pattern test after two hours of baking at 120° C. and passage through boiling water.

Example 7

A process is carried out as in Example 1 by replacing glacial acetic acid by hydrochloric acid (0.1 g). The varnish does not resist the criss-cross pattern test after treatment for 30 minutes in boiling water even after a baking of 4 hours at 120° C.

Example 8

A process is carried out as in Example 1 by eliminating the light solvents by heating to 60° C. at the atmospheric pressure to obtain a composition having a theoretical dry extract of 26%.

The varnish applied by dipping on to a polycarbonate surface is hardened for 1 hour at 120° C., then immersed in boiling water for half an hour does not resist the criss-cross pattern test. Prolongation of the hardening time to 4 hours at 120° C. or increase of the temperature to 125° C. does not improve the criss-cross pattern test results after treatment to boiling water for half an hour. Furthermore, the longevity in pot (pot life) of such varnish is lower than that of the varnish prepared according to Example 1.

Example 9

A process is carried out as in Example 1 by adding glycidyloxypropyltrimethoxysilane and water, of the second hydrolysis, before evaporation of the light solvents.

Such varnish is applied by dipping to a polycarbonate surface. It is hardened for 4 hours at 120° C. After immersion of half an hour of the hardened varnish in boiling water, it does not resist the criss-cross pattern test.

Example 10

There is mixed in a reactor 425.6 g of methyltrimethoxysilane, 142 g of tetraethoxysilane, 400 g of n-butanol.

Thereafter there is introduced 50 g of glacial acetic acid, 218 g of water. The hydrolysis takes place by cooling the solution to maintain a temperature lower than 50° C. for one hour.

One hour later, the methanol and ethanol formed during hydrolysis are evaporated under vacuum cold conditions to obtain a composition having a theoretical dry extract of 26% (measured in $SiO_2$ and CH $CH_3SiO_{3/2}$ equivalent).

Thereafter there is introduced into the solution 172.8 g of vinyl triethoxysilane, 80 g of glycidyloxypropyltrimethoxysilane, 69 g of water.

This second hydrolysis is effected by maintaining the temperature strictly lower than 40° C.

4 days later, the pH is set to about 4.8 through addition of DBU. A varnish ready for use is obtained.

A polycarbonate surface coated by dipping in this varnish, hardened thereafter by baking for one hour at 120° C. resists the criss-cross pattern test, before and after immersion for half an hour in boiling water.

Example 11

Tests with other bases than BDU.

487.4 g of methyltrimethoxysilane, 142 g of tetraethoxysilane, 240 g of water, 50 g of icy acetic acid, 400 g of n-butanol are mixed together.

The hydrolysis is effected by maintaining the temperature lower than 50° C. One hour later, the light solvents are eliminated in vacuum cold conditions.

There is concentrated up to a theoretical dry extract of 27%, then there is added 80 g of glycidyloxypropyltrimethoxysilane, 20 g of water.

The second hydrolysis is effected at a temperature lower than 40° C.

Three days later, the pH is set to about 4.8 through addition of diazabicyclononene. (DBN).

A polycarbonate surface coated by dipping in such varnish hardened thereafter for 3 hours at 120° C. resists the criss-cross pattern test before and after immersion in boiling water for half an hour.

Example 12

A process is carried out as in the preceding Example, by replacing DBN by N-methylimidazole to set the pH to 4.8.

A polycarbonate surface coated by dipping in this varnish hardened thereafter for 3 hours at 130° C. resists the criss-cross pattern test before and after immersion in boiling water for half an hour.

It will be understood that this invention was merely described in a purely explanative and not at all limitative manner and that any useful modification thereof can be effected without however departing from its scope as defined in the appended claims.

We claim:

1. A stable basic liquid composition of matter suitable for forming transparent coatings on surfaces selected from the group consisting of mineral glass, organic glasses of thermoplastic polymethacrylate and polycarbonate materials, and heat hardenable diallylglycol polycarbonate materials, and having a storage stability of at least 3 months at 15° C., comprising
   in solution in at least one organic solvent, from 10 to 40% by weight of a hardenable organo-silicic compound corresponding to the compound resulting from
   effecting a first hydrolysis reaction at a temperature lower than 50° C. in the presence of a carboxylic acid and water, on at least one alkoxysilane compound (A) of formula $R'_n SI(OR)_{4-n}$ in which $n = 1$ or 2, R represents a radical selected from the group consisting of alkyl radicals with 1 to 4 carbon atoms, the alkyloxyalkyl and acyl radicals, and R' represents a radical selected from the group consisting of alkyl, alkylene, aryl, aralkyl, aklylaryl and alkylenearyl radicals, together with a small amount of $Si(OR'')_4$, wherein R'' is alkyl or alkyloxyalkyl,
   removing under vacuum of volatile alkanol formed in the course of said first hydrolysis
   and
   effecting a second hydrolysis at a temperature lower than 40° C., on a mixture of (1) said first hydrolyzate resulting from said first hydrolysis, and which first hydrolyzate has been concentrated, then rediluted with a solvent less volatile than said alkanol of said first hydrolysis reaction and consisting of a mixture of $C_1$-$C_4$-alkanols, and (2) at least one alkoxysilane compound (C) of formula $R'''SI(OR_1)_3$, in which R''' represents a radical selected from the group consisting of epoxyalkyl and epoxyalkyloxyalkyl radicals, and $R_1$ represents a $C_1$-$C_4$-alkyl radical, then adjustment of pH of the resulting medium to between 3.5 and 5.5 through addition of an organic base.

2. A stable basic liquid composition of matter according to claim 1, wherein said compound (A) is selected from the group consisting of methyltrimethoxysilane, methyltriethoxysilane, propyltrimethoxysilane, ethyltrimethoxysilane, ethyltriethoxysilane, phenyltrimethoxysilane, phenyltriethoxysilane, vinyltrimethoxysilane, vinyltriethoxysilane, dimethyldimethoxysilane, dimethyldiethoxysilane, methyltriacetoxysilane, and propyltriethoxysilane.

3. A composition of matter according to claim 1 wherein said compound (C) is gammaglycidyloxypropyltrimethoxysilane.

4. A material composition according to claim 1, wherein said organic solvent of said organosilicic hardenable compound also contains water.

5. A composition of matter according to claim 1, wherein said compound (B) is selected from the group consisting of tetramethoxysilane, tetraethoxysilane, tetra-n-propyloxysilane, tetramethylglycoloxysilane and, tetraethylglycoloxysilane.

6. A stable base liquid composition of matter suitable for coatings on surfaces selected from the group consisting of mineral glass, organic glasses of thermoplastic material of polymethacrylate and polycarbonate materials, heat hardenable diallylglycolpolycarbonate materials, and having a storage stability of at least 3 months at 15° C., comprising
   in solution in at least one organic solvent, from 10 to 40% by weight of a hardenable organosilicic compound corresponding to the compound resulting from
   effecting a first hydrolysis reaction at a temperature lower than 50° C. in the presence of a carboxylic acid and water, on a tetraalkoxysilane (B), of formula $Si(OR'')_4$ wherein R'' is alkyl or alkoyloxyalkyl and on at least one alkoxysilane compound (A) selected from the group consisting of methyltrimethoxysilane, methyltriethoxysilane, propyltrimethoxysilane, ethyltrimethoxysilane, ethyltriethoxysilane, phenyltrimethoxysilane, phenyltriethoxysilane, vinyltrimethoxysilane, vinyltriethoxysilane, dimethyldimethoxysilane, dimethyldiethoxysilane, methyltriacetoxysilane, and propyltriethoxysilane,
   removing under vacuum of volatile alkanol formed in the course of said first hydrolysis
   and
   effecting a second hydrolysis at a temperature lower than 40° C. on (1) said first hydrolyzate resulting from said first hydrolysis, and which first hydrolyzate has been concentrated, then rediluted with a solvent less volatile than said alkanol of said first hydrolysis reaction and consisting of $C_1$-$C_4$-alkanols, and (2) at least one alkoxysilane compound (C) of formula $R'''Si(OR_1)_3$, in which R''' represents a radical selected from the group consisting of epoxyalkyl and epoxyalkyloxyalkyl radicals, and $R_1$ represents a $C_1$-$C_4$-alkyl radical, then setting of pH of the resulting medium to between 3.5 and 5.5, by addition of an organic base.

7. A composition of matter according to claim 1, wherein said hydrolysis reactions are achieved in the presence of $C_1$-$C_4$-alkanols as solvents.

8. A composition of matter according to claim 6, wherein said hydrolysis reactions are achieved in the presence of $C_1$-$C_4$-alkanols as solvents.

9. A composition of matter according to claim 1, wherein said carboxylic acid is selected from the group consisting of acetic, propionic, butyric, and acrylic acids.

10. A composition of matter according to claim 6, wherein said carboxylic acid is selected from the group consisting of acetic, propionic, butyric, and acrylic acids.

11. A composition of matter according to claim 1, wherein said organic base is selected from the group consisting of imidazoles, imidines, cyclic and bicyclic imidines N-methylimidazole, diazabicycloundecene (DBU) and diazabicyclononene (DBN).

12. A composition of matter according to claim 6, wherein said organic base is selected from the group consisting of imidazoles, imidines, cyclic and bicyclic imidines N-methylimidazole, diazabicycloundecene (DBU) and diazabicyclononene (DBN).

13. A composition of matter according to claim 1 wherein concentration of said added organic base corresponding to the desired final pH lies between 0.5 and 5% by weight.

14. A composition of matter according to claim 6, wherein the concentration of said added organic base corresponding to the desired final pH is of between 0.5 and 5% by weight.

15. A process of preparation of a varnish coated product, the coating presenting a combination of the following main properties: good adherence to mineral and organic glass surfaces, good scratching and abrasion strength, good hardness, good opacification strength longevity, good cracking strength and good resistance to water and moist atmospheres, said process consisting essentially of the preparation of a basic liquid composition according to claim 1, presenting a viscosity of between 10 and 20 centipoises, the application of such a composition onto said glass surface so as to obtain a coating containing from 2 to 50 g of solid material per square meter of coated area, and the submission of said coated surface to a thermal treatment to cause hardening thereof.

16. A process according to claim 15, wherein the coating is hardened by heating to a temperature of between 50° and 200° C. for a time period between half an hour and twelve hours.

17. A process of preparation of a varnish coated product, the varnish presenting a combination of the following main properties: good adherence to mineral and organic glass surfaces, good scratching and abrasion strength, good hardness, good opacification strength longevity, good cracking stength, and good resistance to water and moist atmospheres, said process comprising the preparation of a basic liquid composition according to claim 6, having a viscosity of between 10 and 20 centipoises, the application of said liquid composition onto said glass surface in such way as to obtain a coating containing from 2 to 30 g of solid material per square meter of coated area, and the submission of said coated surface to a thermal treatment to cause hardening thereof.

18. A process according to claim 17, wherein the coating is hardened by heating to a temperature of between 50° and 200° C. for a time period between half an hour and twelve hours.

19. A composition of matter according to claim 5 wherein said $Si(OR'')_4$ is present in an amount of up to about 0.3 moles per mole of compound (A).

20. A composition of matter according to claim 6 wherein said tetralkoxysilane (B) is present in an amount of up to about 0.3 moles per mole of compound (A).

* * * * *